(No Model.) 2 Sheets—Sheet 1.
J. R. CRUNKLETON.
BICYCLE SUPPORT.
No. 518,022. Patented Apr. 10, 1894.
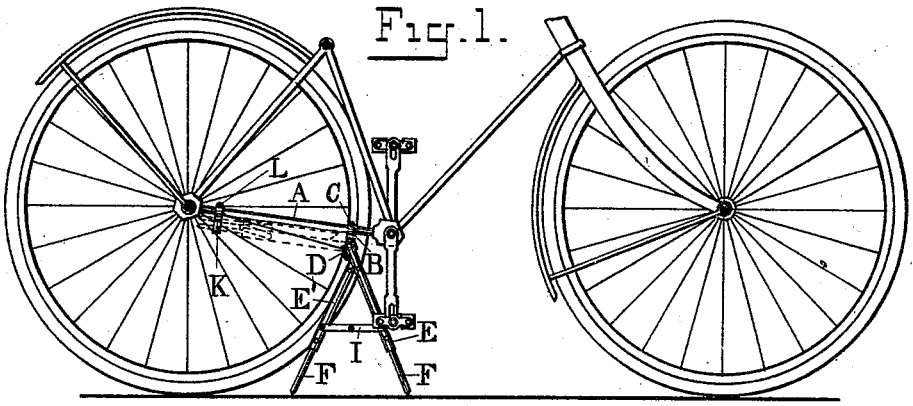
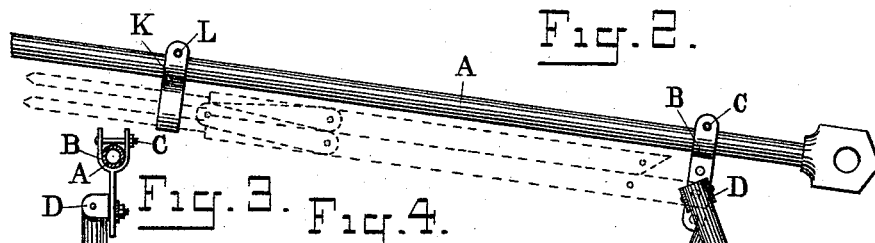
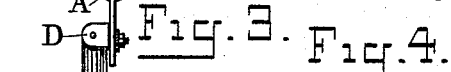
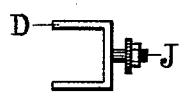
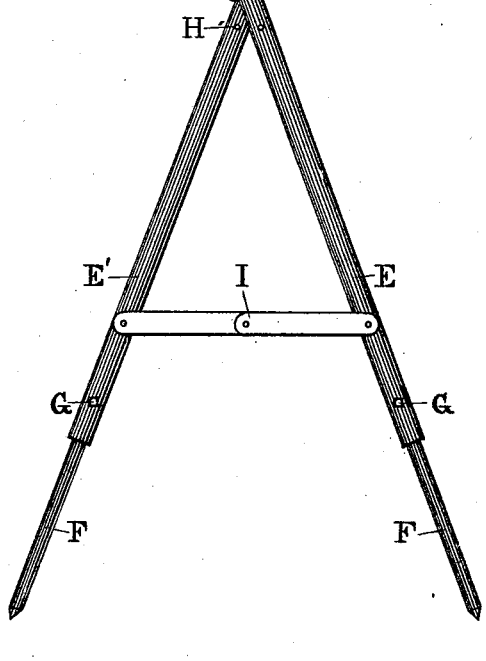
Witnesses
C. B. Rencher
H. Alber
Inventor
John R. Crunkleton
By his Attorney P. Byrne

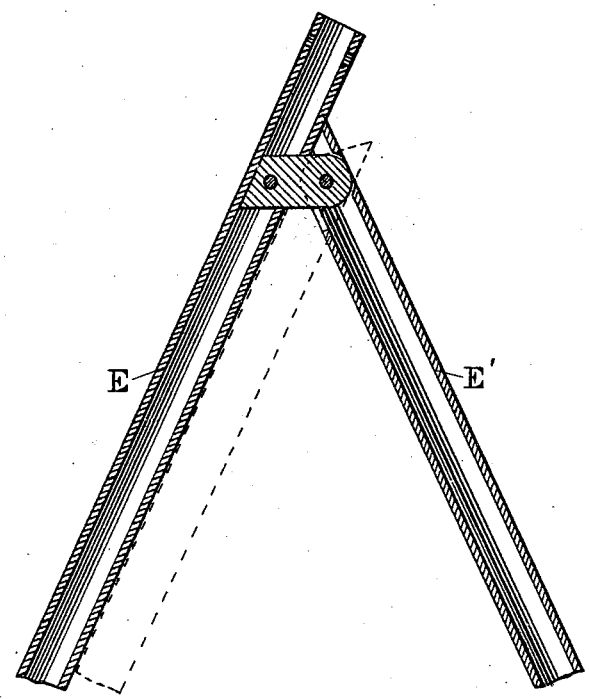

UNITED STATES PATENT OFFICE.

JOHN RUSH CRUNKLETON, OF BIRMINGHAM, ALABAMA.

BICYCLE-SUPPORT.

SPECIFICATION forming part of Letters Patent No. 518,022, dated April 10, 1894.

Application filed July 31, 1893. Serial No. 481,964. (No model.)

*To all whom it may concern:*

Be it known that I, JOHN RUSH CRUNKLETON, a citizen of the United States, residing at Birmingham, in the county of Jefferson and State of Alabama, have invented certain new and useful Improvements in Bicycle-Supports; and I do hereby declare the following to be a full, clear, and exact description of the invention, such as will enable others skilled in the art to which it appertains to make and use the same.

My invention relates to improvements in that class of devices used to support a safety bicycle, or to hold it in a vertical position when not in use; and the objects of my improvement are, first, to provide a device of that kind simple and cheap to construct in all its parts, which can be easily attached to any of the usual forms of safety bicycles now in use, the device can be readily removed if not needed, or if so desired, the support not interfering in any manner with the running parts of the bicycle; second, to provide a device to support a bicycle having two legs, the shorter leg pivoted to a plate secured in the long leg, both legs connected together near the center by a jointed brace to keep them extended when opened, the longer leg pivoted to a clamp adapted to be attached to the side bar of a bicycle. I attain these objects by the mechanism illustrated in the accompanying drawings, in which—

Figure 1, is a vertical side view of part of a safety bicycle, with my supporting device attached to the frame. Fig. 2, is an enlarged vertical side view of my device attached to the bottom brace of a bicycle frame. Fig. 3, is a vertical front view of the same. Fig. 4, is an end view of the hook attached to the frame to hold the ends of the legs up when folded. Fig. 5, is an enlarged view of the swivel head, to which the legs of the device are pivoted. Fig. 6, is a side view of the same. Fig. 7, is an enlarged vertical sectional view of the upper part of the legs, showing the plate to which the short leg is pivoted.

Similar letters refer to similar parts throughout the several views.

The part of the safety bicycle frame shown, represents the usual form of frame, the bottom brace A is the usual bottom brace running from the pedal journal, to the journal of the hind wheel, a clamp B made of light metallic material, is secured to the brace A by a bolt C, the said clamp extending downward and provided with one, or more holes for the pivot pin of a swivel head D, the legs can be adjusted up or down the distance between the holes in the clamp by the placing of the swivel head in the top, or bottom hole, the pivot head is secured in the clamp, with a washer and nut on the end of the pivot pin, allowing sufficient freedom for the head to turn freely on its pivot.

The legs E. E' of the supporting device, is made of light tubing, or other suitable material, they are provided at the bottom with extension pieces F. F, made of light steel rod, the extensions sliding inside the tubes to adjust the legs, to fit different sizes and makes of bicycles, they are secured in the tubes by set screws G. G, the legs are joined together by a plate inserted and riveted securely in the leg E, the end of the plate extending outside a sufficient distance, to attach the short leg E' by a pivot H which allows them to open freely, the legs are connected near the center by a jointed brace I made of light sheet metal, the brace holding the legs rigid and firm when extended, the leg E of the supporting device is secured in the swivel head D. by a pin passing through and riveted on the outside of the jaws, the legs turning freely on the pin in the head.

A hook clamp K made of light metallic material, is secured on the frame brace A by a bolt L, the clamp extending downward and having hooks formed on its lower end, the hooks are used to support the legs of the device when folded up, and not in use as shown by dotted lines, when placed in that position, the device does not in any manner interfere with the operation of the bicycle.

To place the device on any of the safety bicycles now in use, the bolt is removed from the clamp B and the clamp placed stradling the brace A, the bolt is inserted and the nut screwed to place until the clamp is secured, the hook clamp is attached to the brace in the same manner, the pin of the swivel head is placed in one of the holes in the clamp B, and secured with the nut on the end of the pin, the extension pieces are adjusted in the legs to fit the height of the bicycle, and the device is ready for use.

Having thus described my invention, what I claim as new, and desire to secure by Letters Patent, is—

A bicycle support, consisting of a clamp secured to the frame brace of the bicycle, a swivel head secured in one of the holes in the clamp, a pair of legs pivoted together near the top the longest leg pivoted in the swivel head, a jointed brace pivoted to the legs near the center, adjustable extension pieces secured in the legs by set screws, a hook clamp secured on the frame brace of the bicycle, having hooks to support the legs of the supporting device when folded, all combined as set forth and for the purpose described.

In testimony whereof I affix my signature in presence of two witnesses.

JOHN RUSH CRUNKLETON.

Witnesses:
O. V. DOZIER,
J. W. TAYLOR.